United States Patent
Haukaas et al.

(10) Patent No.: US 6,945,182 B1
(45) Date of Patent: Sep. 20, 2005

(54) MIDROW LEVELLING ATTACHMENT FOR A SEEDER

(75) Inventors: Duane Haukaas, Mortlach (CA); Greg Haukaas, Mortlach (CA)

(73) Assignee: Haukaas Manufacturing Limited, Saskatchewan (CA)

( * ) Notice: Subject to any disclaimer, the term of this patent is extended or adjusted under 35 U.S.C. 154(b) by 0 days.

(21) Appl. No.: 10/864,451

(22) Filed: Jun. 10, 2004

(51) Int. Cl.[7] .............................. A01C 5/06; A01C 7/08
(52) U.S. Cl. ..................... 111/60; 111/136; 111/137; 111/148; 111/195
(58) Field of Search .................... 111/59–62, 134–137, 111/189–196, 148

(56) References Cited

U.S. PATENT DOCUMENTS 6,237,697 B1 * 5/2001 Butterfield et al. ......... 172/566

* cited by examiner

Primary Examiner—Christopher J. Novosad
(74) Attorney, Agent, or Firm—Adrian D. Battison; Michael R. Williams; Ryan W. Dupuis

(57) ABSTRACT

A midrow levelling attachment for a seeder includes a set of leveller gangs each of which is mounted on a respective one of the packer wheel gangs of the seeder by a pair of mounting members one at each end of the common shaft of the leveller gang. The levelling roller gang is arranged such that each roller has the peripheral surface thereof located at a position aligned with a location on the ground between a respective pair of the shanks of the seeder and each roller is located rearwardly of the respective pair of shanks and in front of the packer wheels for engaging the ground between the furrows formed by the furrow forming element of the respective pair of shanks. The peripheral surface of each levelling roller is shaped with an apex and two inclined sides such as the peripheral surface rolls over the ground between the furrows it tends to push the soil back into the furrows.

23 Claims, 5 Drawing Sheets

MIDROW LEVELLING ATTACHMENT FOR A SEEDER

This invention relates to a midrow levelling attachment for a seeder.

BACKGROUND OF THE INVENTION

Conventional seeders commonly provide a seeder frame mounted on ground wheels for passage over a field that is to be seeded so that the frame carries a series of shanks arranged at pace positions on the frame. Generally there are three or four rows of shanks spaced forwardly along the direction of travel of the frame with the shanks being spaced also transversely of the direction of travel so that the finished array of shanks provides the required spacing of the shanks across the ground to provide a required of the spacing of the seeds when applied.

Each shank carries a furrow forming element and a seed delivery element so that the seed is deposited into the furrow behind the furrow forming element. The furrow forming element can be selected according to conditions and can comprise a narrow knife having the width in the order of two inches, a wider sweep having width in the order of six inches or still a wider shovel which can have a width up to twelve inches. In all cases the element actively lifts the soil to form a furrow through which the shank passes with the seed being deposited behind the shank into the furrow.

Many seeders are designed for single pass operation so that a packer gang is carried behind the seeder to pack the furrows with the seed deposited in the furrow. In many cases the packers are formed into separate gangs each carried on a separate frame and trailed behind the seeder frames so that the packer gangs are arranged in a row across the width of the seeder frame. The packer rollers are generally arranged so that during operation they are aligned with the shank so the each roller runs over the furrow formed by the shank with the intention of packing the soil back into the furrow.

Manufacturers and farmers have been aware that the soil which is expelled from the furrow during the forming of the furrow often does not properly return to the furrow plus tend to leave the furrow open and the seeds exposed. In addition the soil lifted from the furrow may contained clogs or lumps which interfere with the packer wheel running properly within the furrow and may act to lift the packer wheel and the gang away from the ground so the packing action is ineffective.

For example KHart Industries Ltd. of Elrose, Saskatchewan provides an element which is attached to the shank and runs behind the shank with the intention of closing the furrow. It is stated to have the benefits of:

An increase germination by helping to eliminate seed rows from drying out.

It increase even crop emergence by having an even amount of soil coverage over each see row.

It helps knock down rough soil ridges reducing equipment breakage.

This device therefore is a first attempt to solve the known problems.

In addition Concord Seeders (which are division of Case IH) disclose an arrangements which provides and additional roller behind the first and second rows of shanks which is intend to assist in the returning the soil to the furrow. This roller provides a rounded periphery and it located at a position that aligns with the next row of shanks. Plus a third row of shanks in the seeder has no associated roller. This is particular disadvantageous in that the third row of shanks provides a furrow which is therefore in formation as it is reached by the packer wheel so that there is in particular ineffective packing in respect of the third row of shanks. Thus the seeding rows are inconsistent depending on whether they are formed by the first, second or third row of shanks.

It is also known to make what are known as "disc levellers" on the shank at position behind the shank with one disc on each side of the shank so as to attempt to return the soil to the furrow prior to the packing action.

All these devices have achieved some success in resolving the difficulty but none provide a complete solution which is convenient, effective and can be mounted readily on the seeder.

SUMMARY OF THE INVENTION

It is one object of the invention to provide a midrow levelling attachment for a seeder which in accordance with a first aspect has an improved shape and operation on the soil and in accordance with a second aspect has an improved mounting arrangement.

According to one aspect of the invention there is provided a midrow levelling attachment for a seeder of the type comprising: a seeder frame arranged to be transported across a field to be seeded in a direction of travel; a plurality of shanks mounted on the seeder frame at positions thereon spaced both transversely and to and along the direction of travel to provide an array of shanks at a required spacing across the direction of travel for seeding in the field at the required spacing; each shank having a furrow forming element mounted thereon for engaging the ground in a furrow forming action such that a furrow is formed along the line of the shank and soil is displaced from the ground to each side of the line of the shank and each shank having a seed supply element for discharging seeds in a row in the furrow behind the furrow forming element;

wherein the midrow levelling attachment comprises:

a plurality of levelling rollers each having two side edges and a peripheral surface between the side edges for rolling over the ground;

and mounting elements for mounting the levelling rollers on the seeder, the mounting elements being arranged such that each roller has the peripheral surface thereof located at a position aligned with a location on the ground between a respective pair of the shanks and each roller is located rearwardly of the respective pair of shanks for engaging the ground between the furrows formed by the furrow forming element of the respective pair of shanks;

the peripheral surface of each levelling roller being shaped, when considered in cross-section and in engagement with the ground, to provide a central depending apex between the two side edges and two side portions one each side of the apex which are inclined from the apex upwardly and outward to the respective side edge, such that as the peripheral surface rolls over the ground between the furrows the side portions tend to push the soil back into the furrows. the frame of the seeder either from the shanks or separately.

Preferably the mounting elements are arranged such that all of the levelling rollers are located with the rollers in a row across the frame. However the rollers may be mounted individually or as separate gangs at separate positions within the seeder construction.

Preferably the levelling rollers of the gang are mounted on a common shaft.

Preferably the seeder includes a plurality of packer rollers and wherein the mounting elements are arranged such that the levelling rollers are arranged in advance of the packing rollers.

Preferably the seeder is arranged such that there is a packer roller for each shank and located at a position aligned behind the respective shank and wherein the mounting elements are arranged such that each levelling roller is mounted at a position aligned between two if the packing rollers.

Preferably the mounting elements are arranged such that the levelling rollers are mounted in association with the packer rollers. That is they are carried on the same mounting construction as the packer rollers. However an alternative mounting arrangement may be used.

Preferably the seeder includes a plurality of packer roller gangs and wherein the attachment includes a plurality of levelling roller gangs with the mounting elements of each arranged such that each levelling roller gang is mounted on or more particularly on the frame of a respective one of the packer roller gangs.

Preferably the mounting elements are arranged such that the levelling wherein the attachment includes a plurality of levelling roller gangs with the mounting elements of each arranged such that each levelling roller gang is mounted on or more particularly on the frame of a respective one of the packer roller gangs.

Preferably the mounting elements are arranged such that the levelling rollers of each levelling roller gang are mounted immediately in front of the packer rollers of the respective packer roller gang.

Preferably the mounting elements are arranged such that the levelling rollers of each levelling roller gang are pivotally mounted relative to the packer roller gang.

Preferably the mounting elements are arranged such that the levelling rollers of each levelling roller gang are spring biased relative to the packer roller gang about the pivot axis so as to be biased downwardly into ground engagement.

Preferably the pivot axis lies behind the axis of the packer rollers of the packer roller gang.

Preferably the mounting elements are arranged such that the levelling rollers of each levelling roller gang are mounted on a common gang shaft and include two mounting members for mounting the gang shaft on the packer roller gang, each arranged adjacent a respective end of the shaft.

Preferably each mounting member is arranged to be mounted on a respective frame section of the packer roller gang.

According to a second aspect of the invention there is provided a midrow levelling attachment for a seeder, the seeder comprising:

a seeder frame arranged to be transported across a field to be seeded in a direction of travel;

a plurality of shanks mounted on the seeder frame at positions thereon spaced both transversely and to and along the direction of travel to provide an array of shanks at a required spacing across the direction of travel for seeding in the field at the required spacing;

each shank having a furrow forming element mounted thereon for engaging the ground in a furrow forming action such that a furrow is formed along the line of the shank and soil is displaced from the ground to each side of the line of the shank and each shank having a seed supply element for discharging seeds in a row in the furrow behind the furrow forming element;

and a plurality of packer roller gangs at spaced positions across the width of the seeder frame;

each packer roller gang including a packer roller gang frame mounted on the seeder frame so as to be trailed behind the seeder frame and a plurality of packer rollers;

the midrow levelling attachment comprising:

a plurality of levelling rollers arranged in a levelling roller gang;

each levelling roller having two side edges and a peripheral surface between the side edges for rolling over the ground;

and mounting members for mounting the levelling roller gang on the packer roller gang frame;

the mounting members and the levelling roller gang being arranged such that each roller has the peripheral surface thereof located at a position aligned with a location on the ground between a respective pair of the shanks and each roller is located rearwardly of the respective pair of shanks for engaging the ground between the furrows formed by the furrow forming element of the respective pair of shanks;

the mounting members and the levelling roller gang being arranged such that each roller has the peripheral surface thereof located in advance of the packer rollers of the packer roller gang;

the peripheral surface of each levelling roller being shaped such that as the peripheral surface rolls over the ground between the furrows it tends to push the soil back into the furrows.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
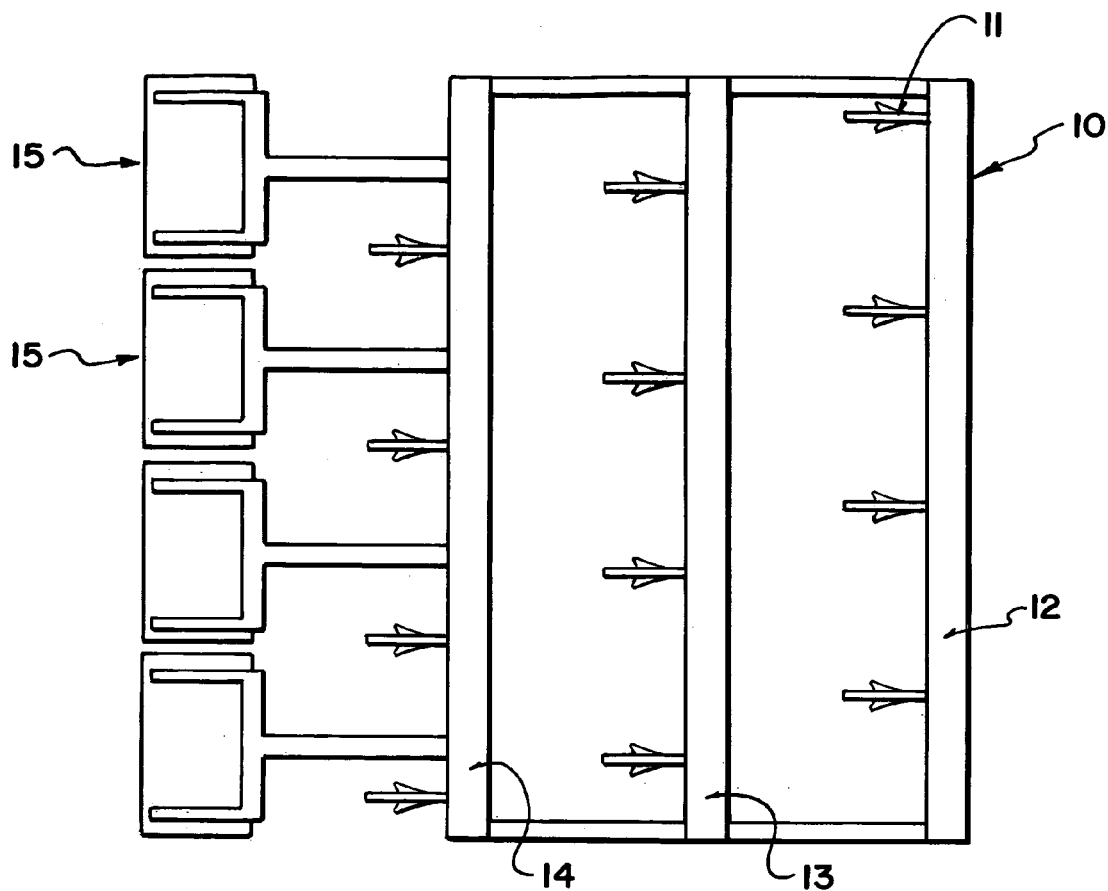
FIG. 1 is a top plan view of a seeder of a type with which to present image is concerned together with the attachment according to present invention managed on the seeder.

In FIG. 1 it is shown the ground working components of the seeder which includes generally a frame 10 including a plurality of shanks 11 arranged in rows and columns in well known manner to provide a required spacing of the shanks across the ground to provide the required row spacing of the finished seeded rows. The seeder frame includes three tool bars 12, 13 and 14 each of which carries one third of the shanks. The seeder frame is mounted on ground wheels (which is not shown). The seeder frame is shown symmetrically as a single integral construction that would be well know to some in the art but such frame is generally formed into separate section which can be folded and which can float when routed to the next will each carry on its own ground wheels to provide better control of ground height and to provide a required folding act of the implement when is in transportation mode.

At the rear of the frame is provided a plurality of packer gangs 15 each of which is separate from the next but which together form a row of packer rollers across the width of the frame with the rollers being spaced at the same spacing as the shanks for each roller follows a respective shank in a packing action.

Figure 5:
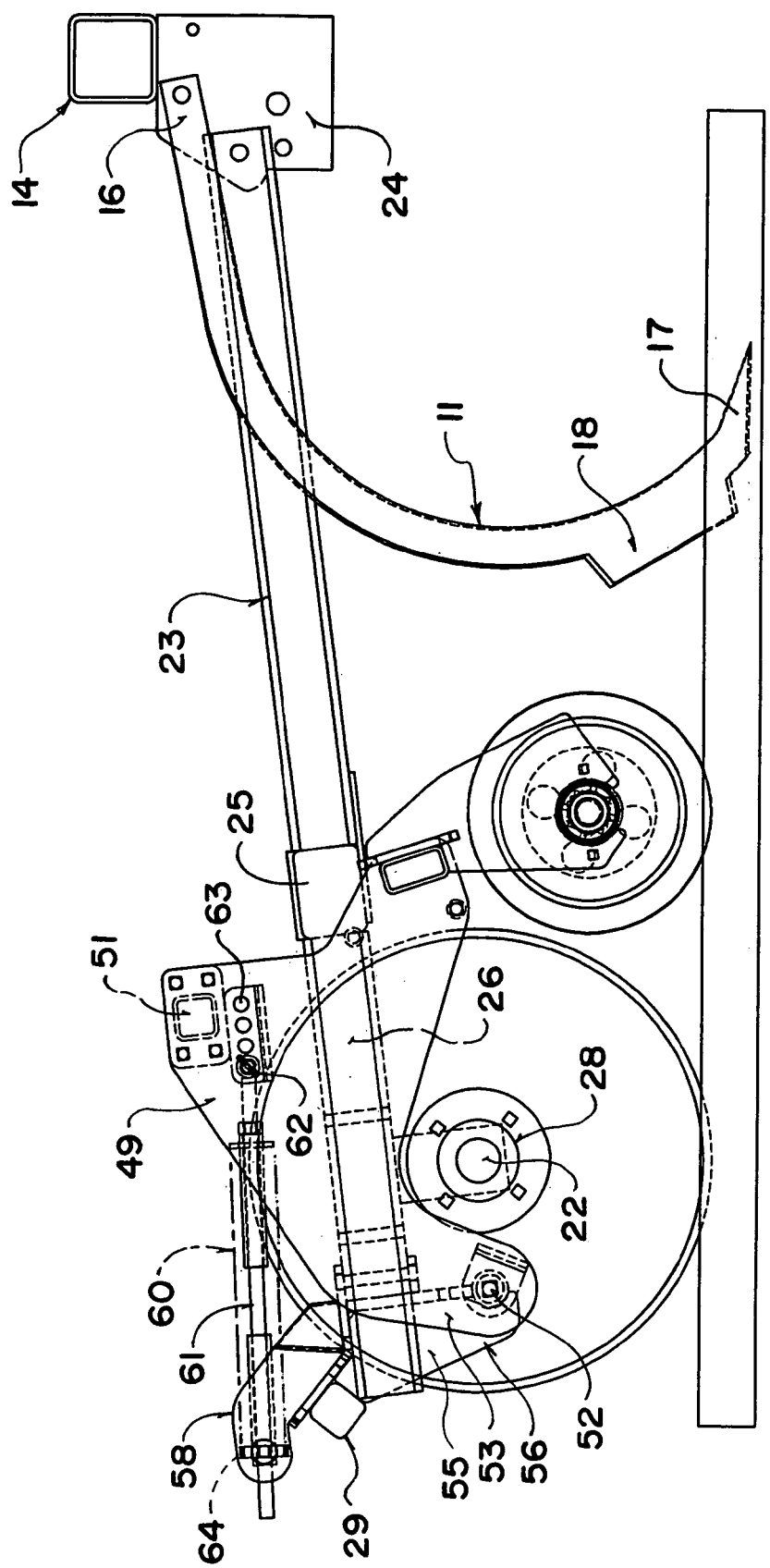
FIG. 5 is a side elevational view of the elements of FIG. 3.

As shown in FIG. 5, each shank 11 is carried on its respective tool bar by a pivot mounting 16 which includes a trip mechanism (not shown). The shank 11 carries a ground engaging furrow forming element 17 again shown only schematically since the construction of the arrangement of such ground engaging elements is well known to one skilled in the art. Yet further the shank carries a seed dispensing element 18 at the rear of the shank so as to deposit seed into the furrow formed by element 17. This element is well known to one skilled in the art so is shown only schematically. Suitable seed transportation ducts and seed supply systems are of course necessary for the seeding system and these again are not shown as they are well known to one skilled in the art.

Figure 3:
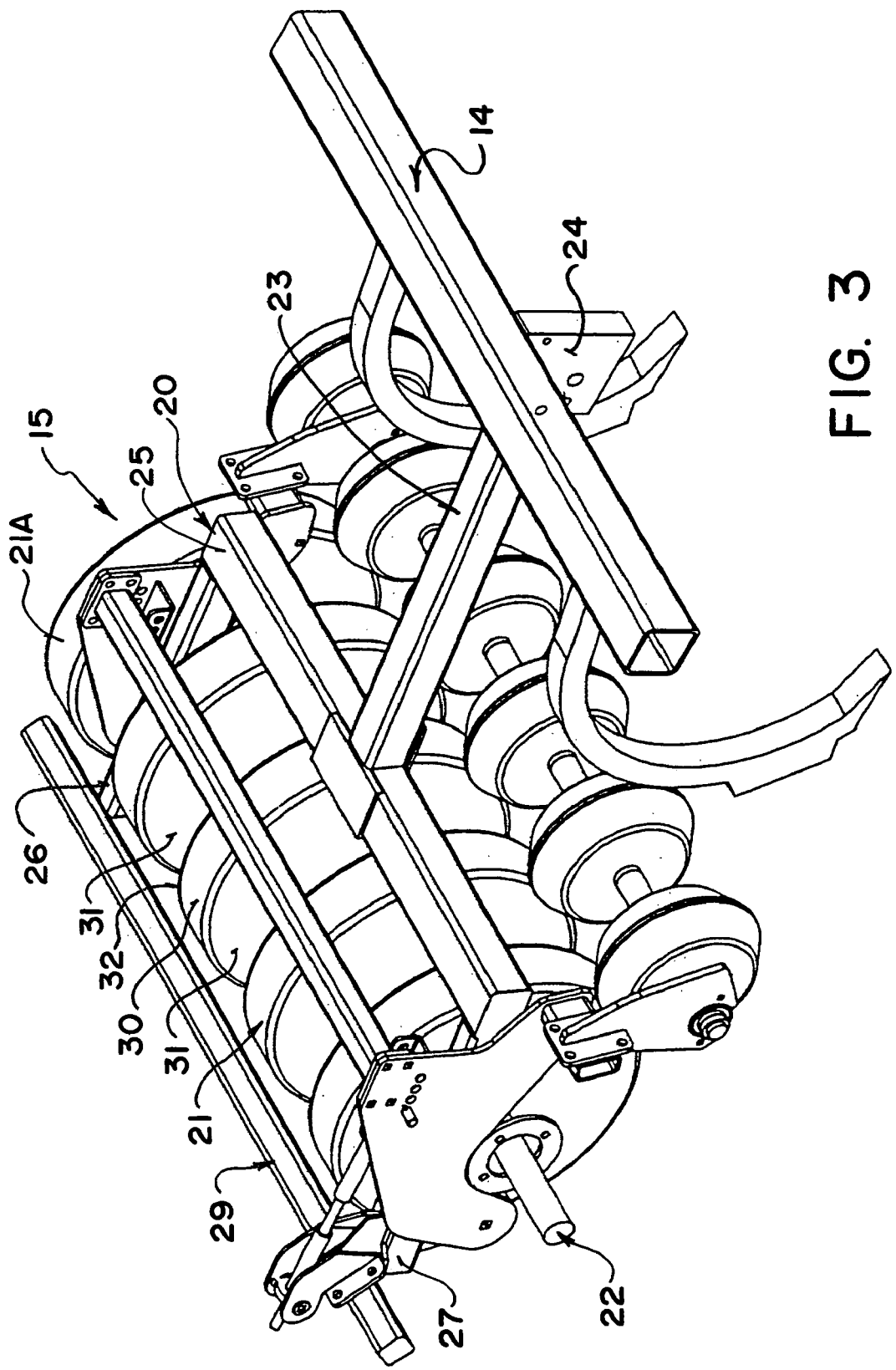
FIG. 3 is an isometric view showing the rear tool bar and rear shanks of the seeder together with one of the packer gangs to which is attached a respective one of the leveller gangs according to present invention.

As shown in FIGS. 3 and 5, each packer gang 15 comprises a frame 20 which carries a party of packer rollers 21 on a common shaft 22. For full convenience of illustration the end most roller is removed from the figures so as to better show the construction of the leveller gang which is mounted on the packer gang where the present invention is concerned.

The frame 20 comprises an arm 23 which is pivotally attached to a bracket 24 on the tool bar 14. Thus the arm is constrained against side to side movement but is free to move upwardly and downwardly under the weight of the packer gang so as to apply weight to the field and to allow the packer gang to float as required while applying the downward pressure. At the rear of the arm 23 is provide a transverse arm 25 extending across the front of most of the packer wheels leaving two end most packer wheels 21A and the omitted packer wheel at the opposite end outboard of the ends of the arm 25. At the ends of the arm 25 is provided a pair of rearwardly extending arms 26 and 27 which provide support for the bearings 28 of the shaft 22 of the packer wheel gang. The shaft 22 is thus mounted underneath the arms 26 and 27 and provides rotating support to which the packer wheels are rigidly attached for rolling commonly with the shaft over the ground as the seeder moves forwardly.

At the rear of the arms 26 and 27 is mounted a cross beam 29 which extends across behind all of the packer wheels and provides a support for scraper elements which extend forwardly from the beam 29 and to engage the side walls of the packer wheels to proved a scraping action for the removal of collection mud and other materials. Again this construction is not shown in detail since it is well known to one skilled in the art.

In the above image showing there are six packer rollers in the packer gang, each associated with a respective one of the shanks 11 and aligned with such to follow the shanks in the field as a seeder moves across the field. Each packer roller has a flat peripheral surface 30 which thus defines a general cylindrical shape together with the two side walls 31 and 32 which lie in a radial plane of the axis of the shaft 22. Commonly the width of the packer wheels is of the order of four to five inches which is sufficient to provide a packing action and sufficiently narrow to apply the weight from the packer gang over an area of the ground sufficient to provide the required packing force. Narrower packer wheels can be used in some circumstances but generally packing gang of this type which trails behind the seeder and thus is spaced from the shank by significant distance requires packer wheels of the order of this width to provide the effective packing action.

Figure 4:
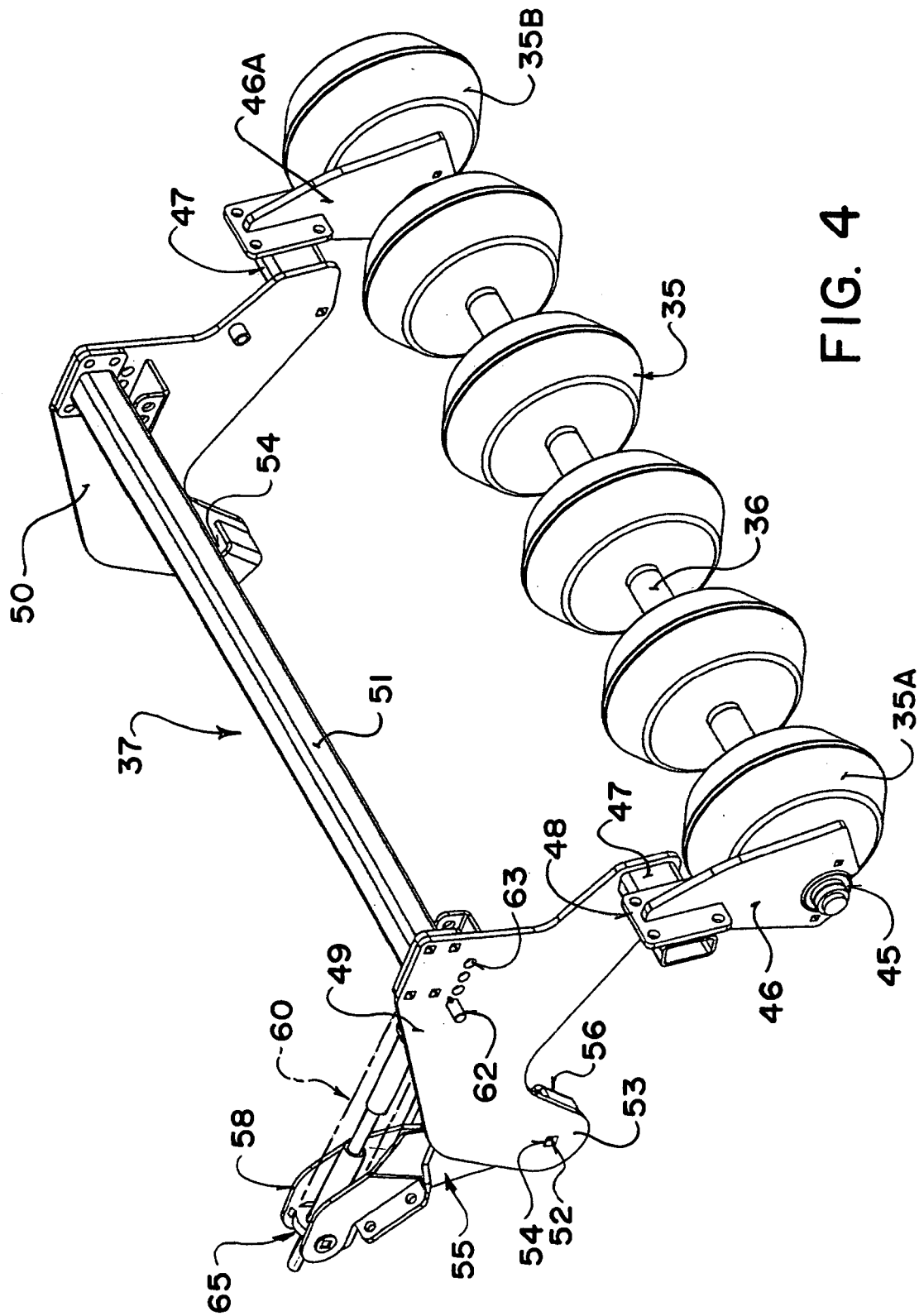
FIG. 4 is an isometric view of the leveller gang of FIG. 3.

The attachment with which the present invention is concerned is shown separately in FIG. 4. This attachment is carried on the respective packer gang and provides also six levelling rollers 35 carried on a shaft 36 mounted on a frame 37. The levelling rollers 35 are fixed to the shaft 36 so as to commonly rotate with the shaft about a horizontal axis parallel to and spaced forwardly from the axis of the packer rollers. The levelling rollers are arranging immediately in front of the packer rollers so that the rear periphery of the levelling rollers approaches the front periphery of the packer rollers. However slight spacing where between is provide so as to allow any trash or collecting material to escape and to avoid collection of such material in the area between the levelling and packing rollers.

Figure 2:
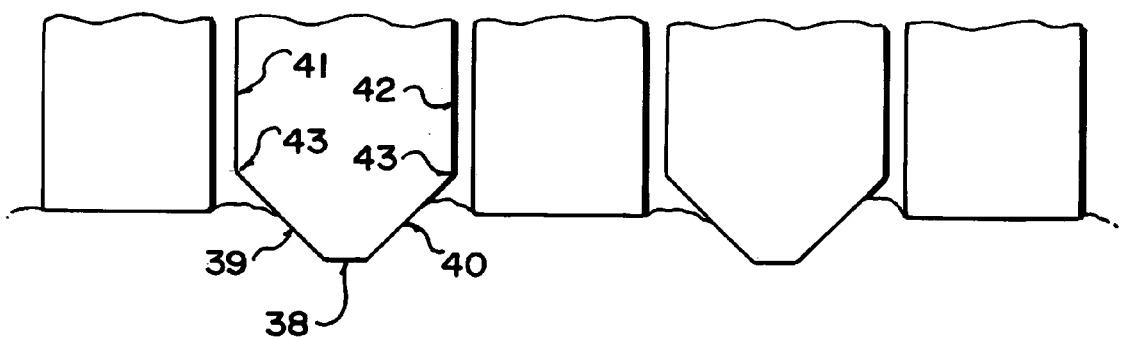
FIG. 2 is a schematic cross sectional view showing three furrows side by side with the operation of the levelling rollers and the packer wheels on the furrows.

The packer rollers are offset from the levelling rollers so that each levelling roller is located in the area between two of the packer rollers as shown in FIG. 2.

The levelling rollers have a width which is slightly less than the spacing between the packer rollers again so as to provide for the escape of any materials collecting in this area. Thus in a typical arrangement where the row spacing is of the order of ten inches, the packer rollers have a width of in order of four inches and the levelling rollers have a width in the order of five inches leaving 0.5 inches space on each side of each levelling roller. The above example of spacing can of course vary depends upon the required finished row spacing that is desirable that the levelling roller be narrower than the spacing between the packer rollers.

The levelling rollers are shaped so that in cross section as best shown in FIG. 2 those relatively narrow apex 38 and the two side portions 39 and 40. These three portions, 38, 39 and 40 across the width of the leveller roller define the peripheral surface between two radial side edges 41 and 42 defining the width of the levelling roller. Thus the side portions 39 and 40 are inclined upwardly and outwardly from the apex when viewed in cross section and when viewed at ground level where the operation of the levelling roller occurs.

The angle of the inclined portions 39 and 40 is preferably in the order of 45° but can be arranged so as to provide a pushing action on the soil as the apex digs into the ground. Thus the inclined side walls do not need to be flat or straight or frusto conical but can be curved or complex in shape provide the required pushing action to the soil is applied. This pushing action occurs provided the apex 38 is deeper then the edge 43 of the portion at the respective side wall 41, 42 of the levelling roller.

In operation, therefore, the levelling rollers are arranged as a common row across the width the seeder in advance of the common row of packer rollers. Each levelling roller is located between two of the packer rollers and therefore between the respective pair of shanks so as to run on the raised section of soil between two furrows. Therefore the apex is located substantially along the mid line between two furrows and the inclined portion on each side of the apex tend to push the soil back toward the furrow as the apex and the levelling roller digs into the ground under its own weight and under spring pressure as described hereinafter. This pushing action does tend to fill in the furrow and tends to break up any clods or lumps in the soil lifted from the furrow during the formation of the furrow.

Figure 6:
FIG. 6 is a photograph showing two sections of a field using the same seeder, one section being seeded without the attachment according to present invention and the other section being seeded with the attachment included.

The completion of levelling of the soil back into the furrow reduces therefore the number and size of the lumps. This action reduces the amount of soil surface exposed thus decreasing erosion and deceasing the drying action on the soil. Further, the levelling action of the levelling roller reduces the undulations in the soil formed by the furrows as is clear from the viewing of FIG. 6 which is the photograph. The reduced undulations in the soil allows subsequent equipment to pass over the soil, primarily in harvesting, at an angle to the furrows or at right angles to the furrows as required for the harvesting process.

The returning of the soil into the furrows also ensures that the furrows are closed over the seed to prevent or reduce the possibility of any seeds being exposed. Yet further return of the soil into the furrow allows the packer wheel to run more effectively in the furrow so as to provide improved packing action. The reduction in lumps also ensures that the packer wheels run more smoothly over the ground with less opportunity for individual packers wheels to be raised thus raising the gang. It should be clear therefore from the photograph that a significantly improved packaging action occurred since the packer wheel runs more effectively on the soil in the furrow in view of the refilling of the furrow before the packer wheel reaches that furrow.

As shown in FIG. 4, the shaft 36 is carried on bearings 45 carried in end plates 46. In order to provide the required offset of the levelling roller left at the packer rollers, the end most one 35A at one end of the shaft 36 is located inboard of the end plate 46 and at the other end, the end most roller 35B is located outboard of the respective end plate 46A. Part of the plates 46 and 46A are mounted on stub shafts 47 of the frame 37 by clamping elements 48 which include U-bolts (not shown). Thus the position of the end plates and the shaft 36 can be adjusted side to side relative to the main part of the frame 37 to provide an accurate location of the levelling rollers relative to the packer rollers.

The frame 37 furrow includes a pair end plates 49 and 50 which are interconnect by a transverse beam 51. These end plates are maintained parallel by the transverse beam 51 and are mounted for pivotal movement about a rear pivot axis 52 carried behind the shaft 22 of the packer wheels. Thus each end plate 49, 50 includes a downwardly depending portion 53 which extends down behind the shaft 22 and between the two of the packer wheels.

The axis 52 is defined by pins 54 carried on respective brackets 55. Each bracket 55 is mounted on a respective one of the arms 26 and 27 of the packer frame. Thus each bracket has a portion which sits on or is bolted to the respective arm and provides a depending portion 56 for supporting the pin 54 to define the axis 52. Thus the depending portion 56 extends again down behind the shaft 22. The bracket 55 also includes an upwardly extending portion 58 which extends upwardly and rearwardly to a position at the cross bar 29 previously described. The portion 58 carries the rear end of a compression spring 60 which extend forwardly to the respective side plate 49, 50 adjacent the cross beam 51. Thus the springs 60, one at each end, provide a spring biasing force tending to turn the frame 37 between the side plates 49 and 50, the cross beam and the shaft 36 in a clockwise direction around the pivot axis 52. This spring action therefore applies downward force on the levelling rollers tending to press the levelling rollers into the ground. The spring 60 each include a control rod 61 which controls the extension of the spring to a maximum position. The control rod 61 can be adjusted in a course adjustment action by relocating a front pin 62 of the rod in a respectively one of the plurality of holes 63 provided in the respective side plate. Fine adjustment of the position of the rod 61 can be obtained by adjusting a nut 64 at the rear end of the rod. The rod is thus mounted in a clevis 65 at the top of the upper extending portion 58 to hold the spring on the rod effectively to provide the forward spring action which press the levelling rollers into the ground.

Adjustment of the rod 61 controls the depth to which the leveller roller will extend downwardly in respect to the arm 23. This depth must be adjusted for different types of furrow forming tools so that the shallower formation of the furrow requires a shallower depth of operation of the leveller roller.

The frame 37 thus provides a simple and ready attachment of the leveller roller shaft and rollers carried there by in the position between the rear shanks and the front of the packer rollers. The rear pivot point provides an effective spring action compressing the leveller rollers into the ground.

The specific details of the brackets 55 can vary depending upon the original equipment with which the attachment is intended to be used. The arrangements shown in the drawings are primarily designed for use with a John Deer seeder. Other types of seeders will require some modifications to the attachment system. However the location of the leveller rollers and the location of the mounting system with the pivot axis is maintained in all arrangements.

Since various modifications can be made in my invention as herein above described, and many apparently widely different embodiments of same made within the spirit and scope of the claims without departure from such spirit and scope, it is intended that all matter contained in the accompanying specification shall be interpreted as illustrative only and not in a limiting sense.

What is claimed is:

1. A midrow levelling attachment for a seeder, the seeder comprising:

a seeder frame arranged to be transported across a field to be seeded in a direction of travel;

a plurality of shanks mounted on the seeder frame at positions thereon spaced both transversely to and along the direction of travel to provide an array of shanks at a required spacing across the direction of travel for seeding in the field at the required spacing;

each shank having a furrow forming element mounted thereon for engaging the ground in a furrow forming action such that a furrow is formed along the line of the shank and soil is displaced from the ground to each side of the line of the shank;

and each shank having a seed supply element for discharging seeds in a row in the furrow behind the furrow forming element;

the midrow levelling attachment comprising:

a plurality of levelling rollers each having two side edges and a peripheral surface between the side edges for rolling over the ground;

and mounting elements for mounting the levelling rollers on the seeder, the mounting elements being arranged such that each roller has the peripheral surface thereof located at a position aligned with a location on the ground between a respective pair of the shanks and each roller is located rearwardly of the respective pair of shanks for engaging the ground between the furrows formed by the furrow forming element of the respective pair of shanks;

the peripheral surface of each levelling roller being shaped, when considered in cross-section and in engagement with the ground, to provide a central depending apex between the two side edges and two side portions one each side of the apex which are inclined from the apex upwardly and outward to the respective side edge, such that as the peripheral surface rolls over the ground between the furrows the side portions tend to push the soil back into the furrows.

2. The attachment according to claim 1 wherein the mounting elements are arranged such that a gang of the levelling rollers is located with the rollers in a row across the frame.

3. The attachment according to claim 2 wherein the levelling rollers of the gang are mounted on a common shaft.

4. The attachment according to claim 1 wherein the mounting elements are arranged such that all of the levelling rollers are located with the rollers in a row across the frame.

5. The attachment according to claim 1 wherein the seeder includes a plurality of packer rollers and wherein the mounting elements are arranged such that the levelling rollers are arranged in advance of the packing rollers.

6. The attachment according to claim 5 wherein the seeder is arranged such that there is a packer roller for each shank and located at a position aligned behind the respective shank and wherein the mounting elements are arranged such that each levelling roller is mounted at a position aligned between two of the packing rollers.

7. The attachment according to claim 1 wherein the mounting elements are arranged such that the levelling rollers are mounted in association with the packer rollers.

8. The attachment according to claim 1 wherein the seeder includes a plurality of packer roller gangs and wherein the attachment includes a plurality of levelling roller gangs with the mounting elements of each arranged such that each levelling roller gang is mounted on a respective one of the packer roller gangs.

9. The attachment according to claim 8 wherein the mounting elements are arranged such that the levelling rollers of each levelling roller gang are mounted directly in front of the packer rollers of the respective packer roller gang.

10. The attachment according to claim 8 wherein the mounting elements are arranged such that the levelling rollers of each levelling roller gang are pivotally mounted relative to the packer roller gang.

11. The attachment according to claim 10 wherein the mounting elements are arranged such that the levelling rollers of each levelling roller gang are spring biased relative to the packer roller gang so as to be biased downwardly into ground engagement.

12. The attachment according to claim 11 wherein the mounting elements are arranged such that the levelling rollers of each levelling roller gang are pivotally mounted relative to the packer roller gang about a pivot axis behind the axis of the packer rollers of the packer roller gang.

13. The attachment according to claim 11 wherein the mounting elements are arranged such that the levelling rollers of each levelling roller gang are mounted on a common gang shaft and include two mounting members for mounting the gang shaft on the packer roller gang, each arranged adjacent a respective end of the shaft.

14. The attachment according to claim 11 wherein each mounting member is arranged to be mounted on a respective frame section of the packer roller gang.

15. A midrow levelling attachment for a seeder, the seeder comprising:
a seeder frame arranged to be transported across a field to be seeded in a direction of travel;
a plurality of shanks mounted on the seeder frame at positions thereon spaced both transversely to and along the direction of travel to provide an array of shanks at a required spacing across the direction of travel for seeding in the field at the required spacing;
each shank having a furrow forming element mounted thereon for engaging the ground in a furrow forming action such that a furrow is formed along the line of the shank and soil is displaced from the ground to each side of the line of the shank;
and each shank having a seed supply element for discharging seeds in a row in the furrow behind the furrow forming element;
and a plurality of packer roller gangs at spaced positions across the width of the seeder frame;
each packer roller gang including a packer roller gang frame mounted on the seeder frame so as to be trailed behind the seeder frame and a plurality of packer rollers;
the midrow levelling attachment comprising:
a plurality of levelling rollers arranged in a levelling roller gang;
each levelling roller having two side edges and a peripheral surface between the side edges for rolling over the ground;
and mounting members for mounting the levelling roller gang on the packer roller gang frame;
the mounting members and the levelling roller gang being arranged such that each roller has the peripheral surface thereof located at a position aligned with a location on the ground between a respective pair of the shanks and each roller is located rearwardly of the respective pair of shanks for engaging the ground between the furrows formed by the furrow forming element of the respective pair of shanks;
the mounting members and the levelling roller gang being arranged such that each roller has the peripheral surface thereof located in advance of the packer rollers of the packer roller gang;
the peripheral surface of each levelling roller being shaped such that as the peripheral surface rolls over the ground between the furrows it tends to push the soil back into the furrows.

16. The attachment according to claim 15 wherein the levelling rollers of the gang are mounted on a common shaft.

17. The attachment according to claim 15 wherein the mounting members and the levelling roller gang are arranged such that each levelling roller is mounted at a position aligned between two of the packing rollers.

18. The attachment according to claim 15 wherein the mounting members are arranged such that the levelling rollers of each levelling roller gang are mounted immediately in front of the packer rollers of the respective packer roller gang.

19. The attachment according to claim 15 wherein the mounting members are arranged such that the levelling rollers of each levelling roller gang are pivotally mounted relative to the packer roller gang.

20. The attachment according to claim 15 wherein the mounting elements are arranged such that the levelling rollers of each levelling roller gang are spring biased relative to the packer roller gang so as to be biased downwardly into ground engagement.

21. The attachment according to claim 15 wherein the mounting elements are arranged such that the levelling rollers of each levelling roller gang are pivotally mounted relative to the packer roller gang about a pivot axis behind the axis of the packer rollers of the packer roller gang.

22. The attachment according to claim 15 wherein the mounting members are arranged such that the levelling rollers of each levelling roller gang are mounted on a common gang shaft and include two mounting members for mounting the gang shaft on the packer roller gang, each arranged adjacent a respective end of the shaft.

23. The attachment according to claim 15 wherein each mounting member is arranged to be mounted on a respective frame section of the packer roller gang.

* * * * *